(12) United States Patent
Hsiao

(10) Patent No.: US 7,377,673 B1
(45) Date of Patent: May 27, 2008

(54) SAFETY LIGHT

(76) Inventor: Yu-Hsiu Hsiao, No. 110, Yuanhuan S. Rd., Fongyuan City, Taichung Hsien (TW)

( * ) Notice: Subject to any disclaimer, the term of this patent is extended or adjusted under 35 U.S.C. 154(b) by 0 days.

(21) Appl. No.: 11/668,583

(22) Filed: Jan. 30, 2007

(51) Int. Cl.
B62J 6/00 (2006.01)
(52) U.S. Cl. .................... 362/474; 362/190; 362/202; 362/208; 362/473; 362/540; 362/800
(58) Field of Classification Search ............ 362/184, 362/190, 194, 202, 205, 206, 208, 362, 399, 362/473, 474, 540, 549, 800; 74/551.1, 551.8
See application file for complete search history.

(56) References Cited

U.S. PATENT DOCUMENTS 2,603,701 A * 7/1952 Schadel, Jr. ............... 340/432
4,716,502 A * 12/1987 Schott et al. .............. 362/474
4,875,142 A * 10/1989 Spector ..................... 362/474
5,247,431 A * 9/1993 Liu ........................... 362/474

* cited by examiner

Primary Examiner—Stephen F. Husar
Assistant Examiner—Meghan K. Dunwiddie
(74) Attorney, Agent, or Firm—Rabin & Berdo, P.C.

(57) ABSTRACT

A safety light is mounted retractably in a handlebar of a bicycle and has a housing, a retaining clamp, a sleeve, a lamp assembly and a spring. The retaining clamp is mounted in the housing. The sleeve is mounted around the housing. The lamp assembly is mounted slidably in and selectively protrudes from the housing and comprises a lamp housing, a retaining post and a light assembly. The lamp housing is mounted slidably in the housing and has an inner end, an outer end and at least one lamp hole. The retaining post is formed on the inner end the lamp housing and is engaged by the clamp. The light assembly is mounted in the lamp housing and comprises a circuit board and at least one lamp. The at least one lamp is mounted on the circuit board. The spring is mounted between the lamp assembly and the retaining clamp.

7 Claims, 6 Drawing Sheets

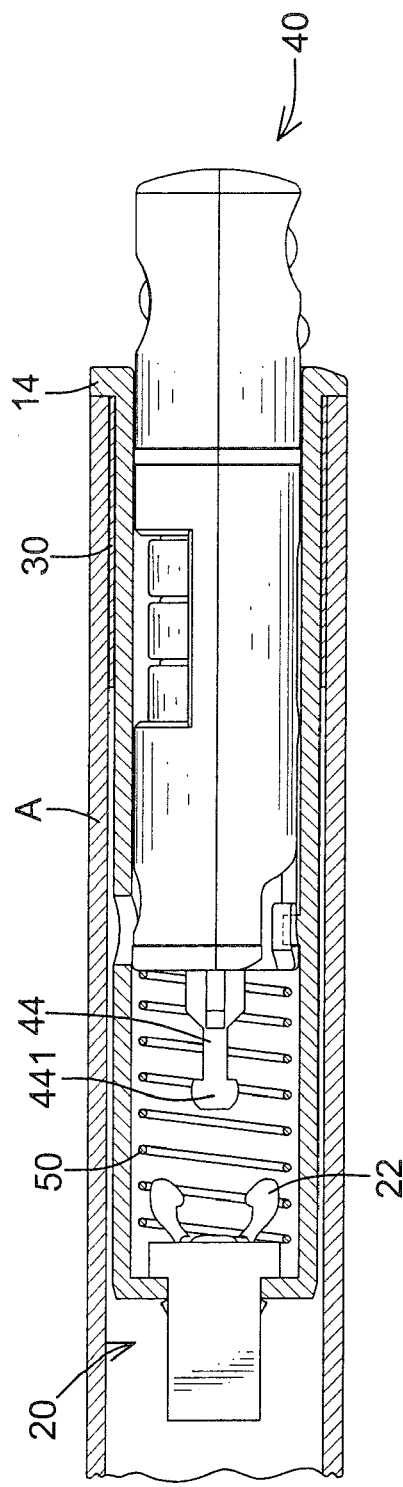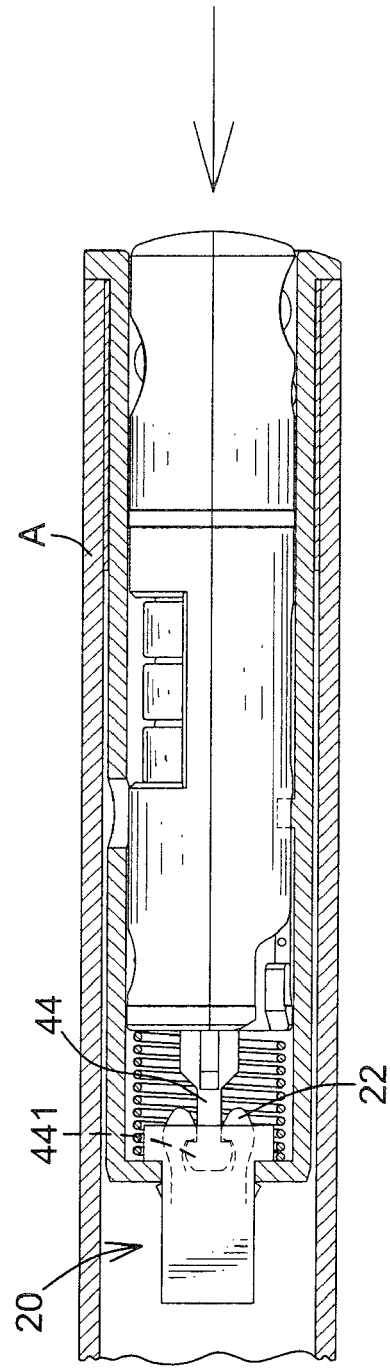
FIG. 4
FIG. 5

SAFETY LIGHT

BACKGROUND OF THE INVENTION

1. Field of Invention

The present invention relates to a light, and more particularly to a safety light that can be mounted in a handlebar of a bicycle and be retracted into the handlebar.

2. Description of the Related Art

Conventional safety lights for bicycles are usually mounted on the frame or the wheels of the bicycles to provide a warning or to provide illumination.

One type of conventional safety lights is tubular, is mounted in the handlebar of a bicycle and has a globe protruding from an end of the handlebar to provide warning or illumination. However, because the globe protrudes from the end of the handlebar, the safety light is easily damaged when the bicycle falls or bumps or is leaned against an object such as a wall, lamppost or the like.

To overcome the shortcomings, the present invention provides a safety light to mitigate or obviate the aforementioned problems.

SUMMARY OF THE INVENTION

The primary objective of the present invention is to provide a safety light that can be mounted in a handlebar of a bicycle and be retracted into the handlebar to keep the safety light from being damaged.

A safety light in accordance with the present invention is mounted retractably in a handlebar of a bicycle and comprises a housing, a retaining clamp, a sleeve, a lamp assembly and a spring. The retaining clamp is mounted securely in the housing. The sleeve is mounted around the housing. The lamp assembly is mounted slidably in from the housing and comprises a lamp housing, a retaining post and a light assembly. The lamp housing is mounted slidably in the housing and has an inner end, an outer end and at least one lamp hole. The retaining post is formed on the inner end of the lamp housing and is engaged by the retaining clamp. The light assembly is mounted in the light assembly chamber and comprises a circuit board and at least one lamp. The at least one lamp is mounted on the circuit board. The spring is mounted between the lamp assembly and the retaining clamp.

Other objectives, advantages and novel features of the invention will become more apparent from the following detailed description when taken in conjunction with the accompanying drawings.

BRIEF DESCRIPTION OF THE DRAWINGS

FIG. 4 is a top view in partial section of the safety light in FIG. 1;

FIG. 5 is an operational top view in partial section of the safety light in FIG. 1 with the lamp assembly retracted;

DETAILED DESCRIPTION OF THE INVENTION

Figure 1:
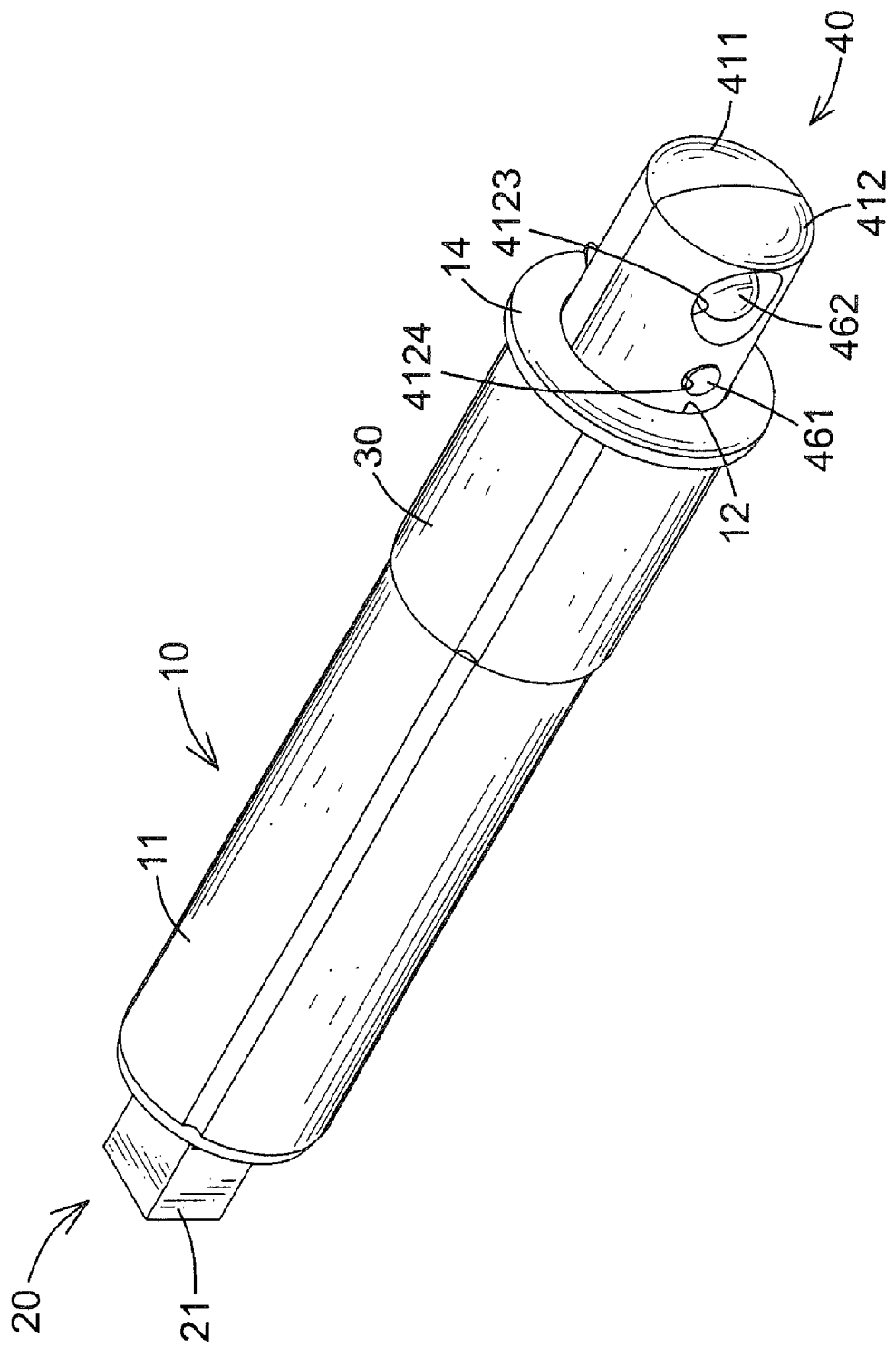
FIG. 1 is a perspective view of a safety light in accordance with the present invention.
Figure 2:
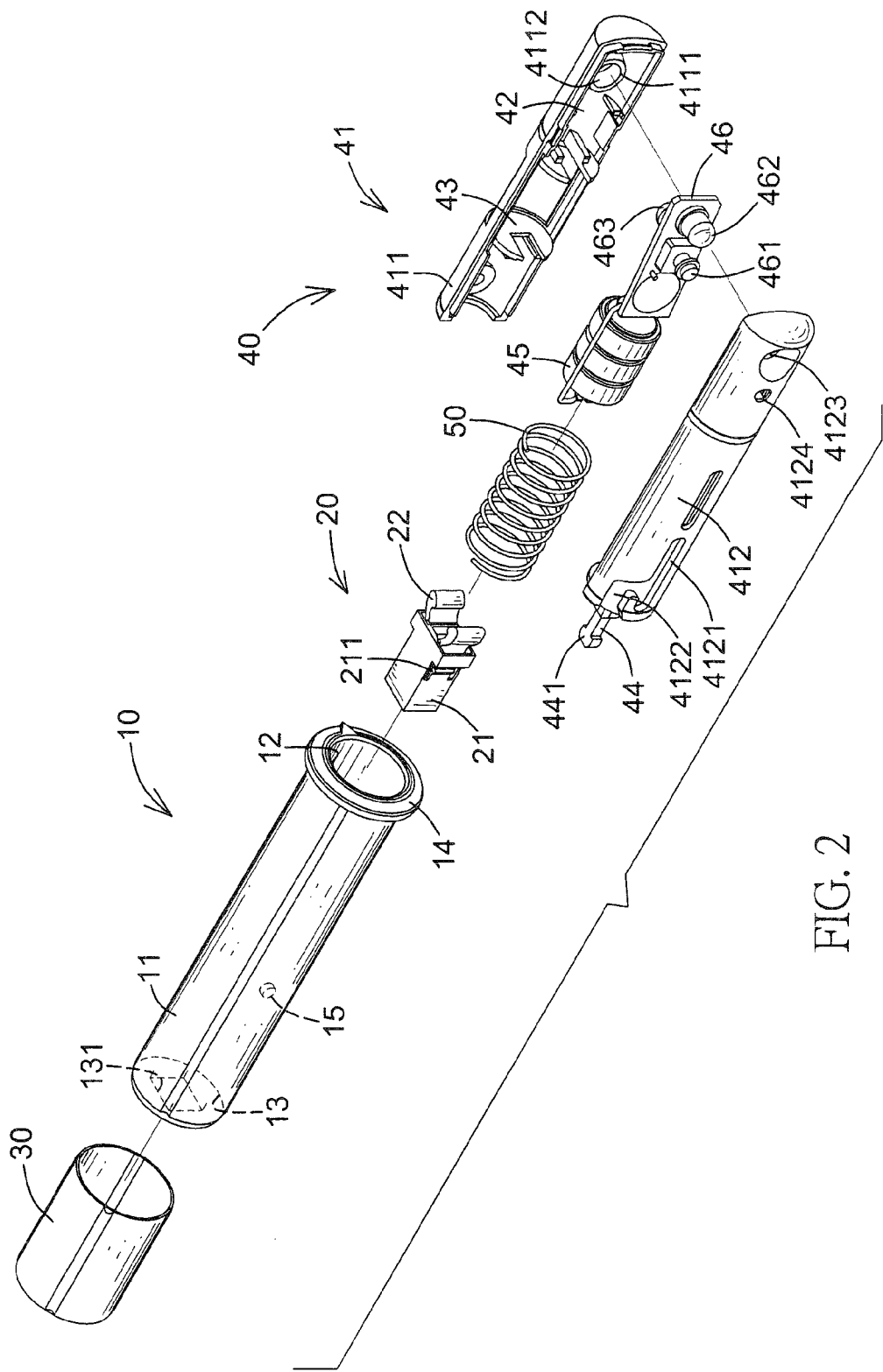
FIG. 2 is an exploded perspective view of the safety light in FIG. 1.

With reference to FIGS. 1, 2, 7A and 7B, a safety light in accordance with the present invention is mounted retractably in an open end of a handlebar (A) of a bicycle, provides both a warning and an illumination capability and comprises a housing (10), a retaining clamp (20), a sleeve (30), a lamp assembly (40) and a spring (50).

The housing (10) is mounted in the handlebar (A) of a bicycle and has a tubular body (11), a flange (14) and a guide key (15). The tubular body (11) has a proximal end (13), a distal end (12), and an inner surface. The proximal end (13) is closed and has a mounting hole (131). The mounting hole (131) may be square and is defined through the proximal end (13) of the tubular body (11). The flange (14) is formed on and protrudes radically out from the distal end (12) of the tubular body (11). The guide key (15) is formed on and protrudes in from the inner surface of the tubular body (11).

With further reference to FIGS. 4 and 5, the retaining clamp (20) is mounted securely through the mounting hole (131) in the tubular body (11) and has a casing (21) and a clamp (22). The casing (21) is mounted securely through the mounting hole (131) in the proximal end (13) of the tubular body (11) and has a front end, two sides, two optional transverse lips and two optional protrusions (211). The front end is open. The transverse lips are formed respectively on and protrude respectively from the sides at the front end of the casing (21) and abut the proximal end (13) inside the tubular body (11). The protrusions (211) are formed on and protrude respectively out from the sides of the casing (21) and engage the proximal end of the tubular body (11) outside the tubular body (11). The clamp (22) is a toggled jaw-type clamp, closes on and clamps an object pressed into the clamp and is mounted in and protrudes from the front end of the casing (21).

The sleeve (30) is tubular, may be resilient, is mounted around the tubular body (11), abuts the flange (14) on the tubular body (11) and holds the housing (10) securely in a tubular handlebar (A).

The lamp assembly (40) is mounted retractably in the housing (10) and comprises a lamp housing (41), a retaining post (44), an optional battery set (45) and a light assembly.

Figure 6:
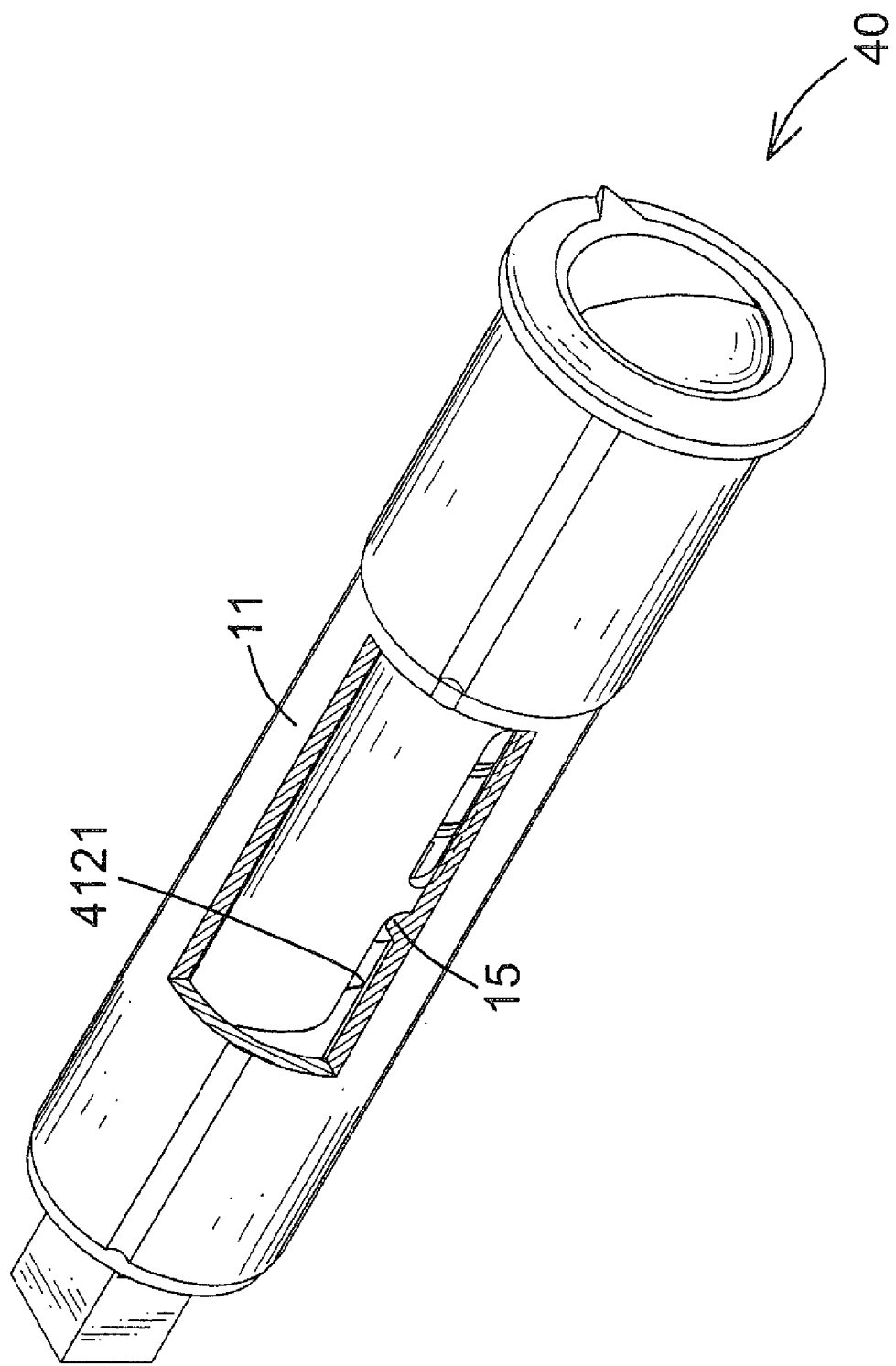
FIG. 6 is an operational perspective view in partial section of the safety light in FIG. 1 with the lamp assembly retracted.
Figures 7A, 7B:
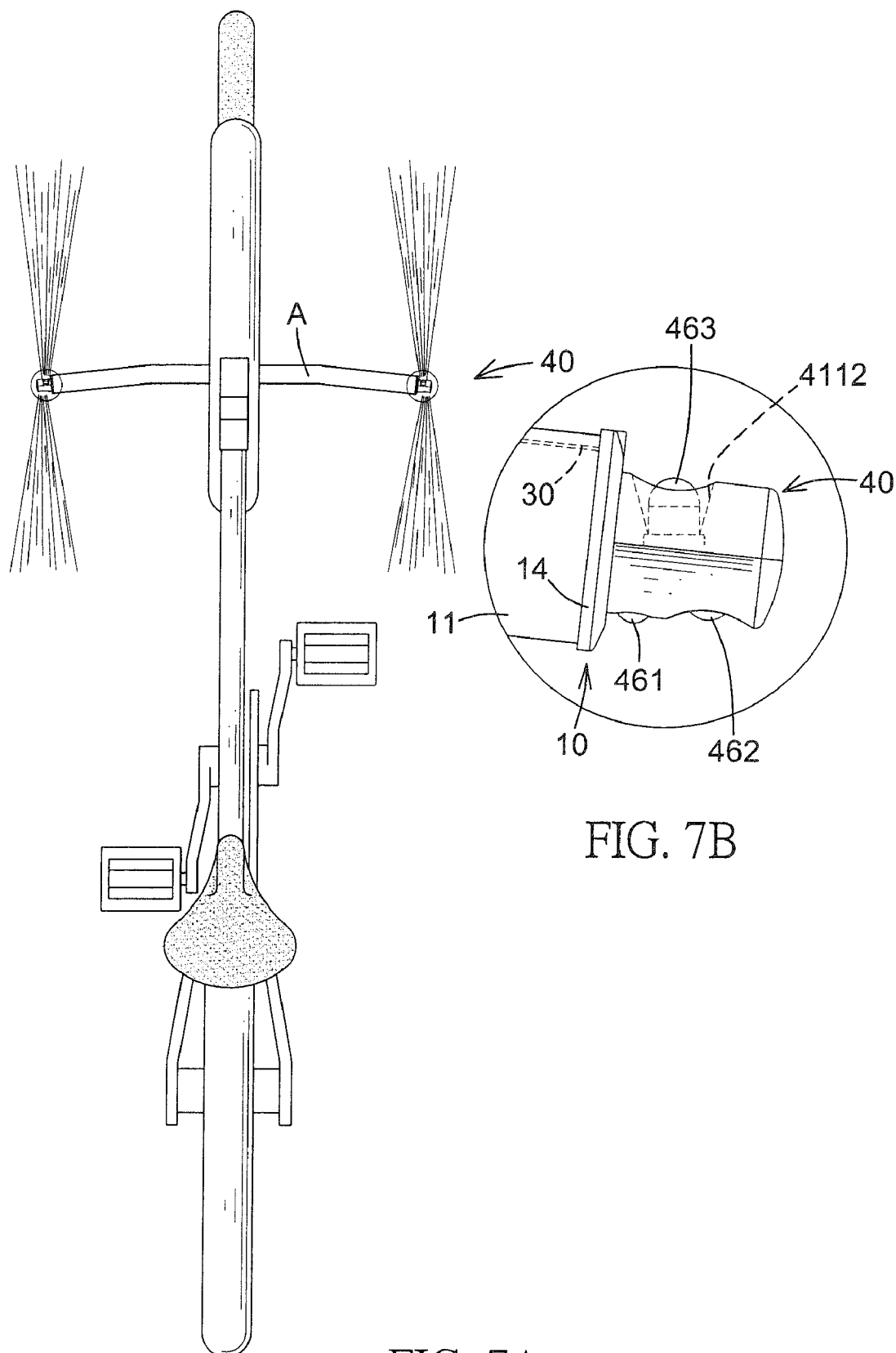
FIG. 7A is an operational top view of a bicycle with the safety light in FIG. 1 mounted in the handlebar of the bicycle.
FIG. 7B is an enlarged top view of the safety light in FIG. 7A.

The lamp housing (41) is cylindrical and hollow, is mounted retractably in the housing (10) an has an outer surface, an inner surface, an inner end, an outer end, a front, a rear, an optional front shell (411), an optional rear shell (412), at least one lamp hole (4111, 4123), a light assembly chamber (42) and a battery chamber (43). The inner end is open. The outer end is closed. The rear has a guide slot (4121), a mounting slot (4122) and an optional switch hole (4124). With further reference to FIG. 6, the guide slot (4121) is defined longitudinally in the outer surface on the rear of the lamp housing (41) and engages the guide key (15) in the tubular body (11) to keep the lamp housing (41) from rotating in the tubular body (11). The mounting slot (4122) may be L-shaped, is defined longitudinally in the outer surface of the rear of the lamp housing (41) and communicates with the inner end of the lamp housing (41) and the guide slot (4121). The switch hole (4124) is defined through the lamp housing (41) near the outer end of the lamp housing (41). The front shell (411) is semicylindrical and hollow. The rear shell (412) is semicylindrical and hollow and corresponds to and is mounted on the front shell (411) to form the lamp housing (41).

The at least one lamp hole (4111, 4123) may be a front lamp hole (4111), a rear lamp hole (4123) or both and is defined through the lamp housing (41) near the outer end. The front lamp hole (4111) is defined through the front of the lamp housing (41) and has an optional conical flange (4112). The conical flange (4112) is formed around the front lamp hole (4111), protrudes in from the inner surface of the lamp housing (41), may be inclined toward the inner end of the lamp housing (41) and may have a silver coating to reflect light. The rear lamp hole (4123) is defined through the rear of the lamp housing (41) near the outer end.

The light assembly chamber (42) is defined in the lamp housing (41) adjacent to the outer end of the lamp housing (41).

The battery chamber (43) is defined in the lamp housing (41) adjacent to the light assembly chamber (42) and communicates with the light assembly chamber (42).

Figure 3:
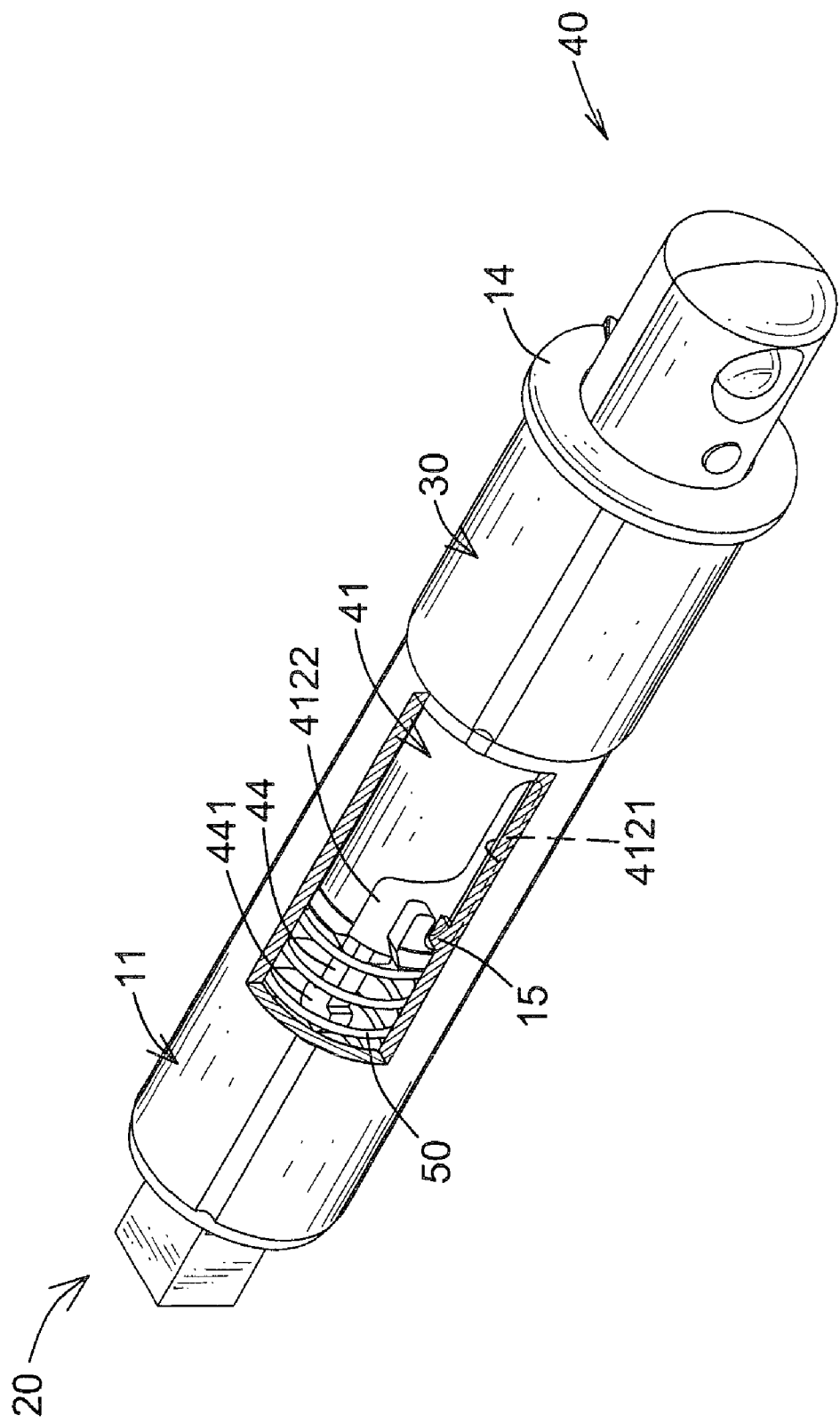
FIG. 3 is a perspective view in partial section of the safety light in FIG. 1.

With further reference to FIG. 3, the retaining post (44) is formed on and protrudes longitudinally from the inner end of the lamp housing (41), selectively engages and is held by the clamp (22) to hold the lamp housing (41) in the tubular body (11) and has a distal end and an enlarged head (441). The enlarged head (441) is formed on the distal end of the retaining post (44) and corresponds to and is held selectively by the clamp (22).

The battery set (45) comprises multiple batteries and is mounted in the battery chamber (43) in the lamp housing (41).

The light assembly is mounted in the light assembly chamber (43) in the lamp housing (41) and comprises a circuit board (46), at least one lamp (462, 463) and an optional pushbutton switch (461), contact switch or slide switch. The circuit board (46) is mounted in the light assembly chamber (42) in the lamp housing (41) and is connected electrically to the battery set (45). The at least one lamp (462, 463) is mounted on the circuit board (46), corresponds respectively to the at least one lamp hole (4111, 4123) and may be a warning lamp (462), an illumination lamp (463) or both. The warning lamp (462) is colored, may be red or yellow, may be an LED, extends through the rear lamp hole (4123) in the lamp housing (41) and warns overtaking traffic of the presence of the bicycle. The illumination lamp (463) is a white light, may be an LED, extends through the front lamp hole (4111) in the lamp housing (41) and provides illumination for a person riding the bicycle. The pushbutton switch (461) is mounted on the circuit board (46), extends through the switch hole (4124) in the rear shell (412) and turns the illumination and warning lamps (462, 463) on and off. The contact switch is connected electrically to the circuit board (46), is mounted on the outer surface of the lamp housing (41) and turns the illumination and warning lamps (462, 463) on and off. The slide switch is connected electrically to the circuit board (46), is mounted between the housing (10) and the lamp housing (41) and turns the illumination and warning lamps (462, 463) on and off.

The spring (50) is mounted in the housing (10) around the retaining post (44) between the lamp assembly (40) and the retaining clamp (20) and pushes the outer end of the lamp housing (41) out of the tubular body (11) to expose the illumination lamp (463), the warning lamp (462) and the pushbutton switch (461).

The safety light as described provides both warning and illumination capabilities and further has the significant advantage of being able to be easily retracted into a bicycle handlebar (A) when the safety light is not in use, which greatly reduces the likelihood that the safety light will be damaged.

Even though numerous characteristics and advantages of the present invention have been set forth in the foregoing description, together with details of the structure and function of the invention, the disclosure is illustrative only. Changes may be made in detail, especially in matters of shape, size and arrangement of parts within the principles of the invention to the full extent indicated by the broad general meaning of the terms in which the appended claims are expressed.

What is claimed is:

1. A safety light comprising
a housing having
a tubular body having
a proximal end being closed and having a mounting hole being defined through the proximal end of the tubular body;
a distal end; and
an inner surface;
a flange being formed on and protruding radically out from the distal end of the tubular body; and
a guide key being formed on and protruding in from the inner surface of the tubular body;
a retaining clamp being mounted securely through the mounting hole in the tubular body and having
a casing being mounted securely through the mounting hole in the proximal end of the tubular body and having
a front end being open; and
a clamp being a toggled jaw-type clamp to close on and clamp an object pressed into the clamp and being mounted in and protruding from the front end the shell;
a sleeve being tubular, being mounted around the tubular body of the housing and abutting the flange on the tubular body of the housing;
a lamp assembly being mounted retractably in the housing and comprising
a lamp housing being mounted in the housing and having
an outer surface;
an inner surface;
an inner end;
an outer end being closed;
a front;
a rear having
a guide slot being defined longitudinally in the outer surface of the lamp housing and engaging the guide key on the tubular body of the housing; and
a mounting slot being defined longitudinally in the outer surface of the lamp housing and communicating with the inner end of the lamp housing and the guide slot;
at least one lamp hole being defined through the lamp housing near the outer end;
a light assembly chamber being defined in the lamp housing adjacent to the outer end of the lamp housing; and
a battery chamber being defined in the lamp housing adjacent to the light assembly chamber and communicating with the light assembly chamber;

a retaining post being formed on and protruding longitudinally from the inner end of the lamp housing, selectively engaging and being held by the clamp and having
   a distal end; and
   an enlarged head being formed on the distal end of the retaining post and corresponding to and being held selectively the clamp; and
a light assembly being mounted in the light assembly chamber in the lamp housing and comprising
   a circuit board being mounted in the light assembly chamber in the lamp housing; and
   at least one LED lamp being mounted on the circuit board and corresponding respectively to the at least on lamp hole in the lamp housing; and
a spring being mounted in the housing around the retaining post between the lamp assembly and the retaining clamp.

2. The safety light as claimed in claim 1, wherein
the at least one lamp hole comprises
   a front lamp hole being defined through the front of the lamp housing; and
   a rear lamp hole being defined through the rear of the lamp housing;
the rear of the lamp housing further has a switch hole defined through the lamp housing near the outer end of the lamp housing; and
the at least one lamp comprises
   a warning lamp extending through the rear lamp hole in the lamp housing; and
   an illumination lamp extending through the front lamp hole in the lamp housing; and
the light assembly further comprises a pushbutton switch mounted on the circuit board and extending through the switch hole in the lamp housing.

3. The safety light as claimed in claim 2, wherein
the lamp housing further has
   a front shell being semicylindrical and hollow; and
   a rear shell being semicylindrical and hollow and corresponding to and being mounted on the front shell.

4. The safety light as claimed in claim 3, wherein the mounting slot is L-shaped.

5. The safety light as claimed in claim 4, wherein
the front lamp hole has a conical flange formed around the front lamp hole, protruding in from the inner surface of the lamp housing and being inclined toward the inner end of the lamp housing.

6. The safety light as claimed in claim 5, wherein
the lamp assembly further comprises a battery set comprising multiple batteries and being mounted in the battery chamber in the lamp housing; and
the circuit board is connected electrically to the battery set.

7. The safety light as claimed in claim 5, wherein the conical flange has a silver coating.

* * * * *